United States Patent [19]

Paranjpe

[11] 4,122,458

[45] Oct. 24, 1978

[54] INK JET PRINTER HAVING PLURAL PARALLEL DEFLECTION FIELDS

[75] Inventor: Suresh C. Paranjpe, Xenia, Ohio

[73] Assignee: The Mead Corporation, Dayton, Ohio

[21] Appl. No.: 825,975

[22] Filed: Aug. 19, 1977

[51] Int. Cl.$^2$ .............................................. G01D 15/18
[52] U.S. Cl. ...................................................... 346/75
[58] Field of Search ........................................ 346/75

[56] References Cited

U.S. PATENT DOCUMENTS

| | | | |
|---|---|---|---|
| 3,701,998 | 10/1972 | Mathis | 346/75 |
| 3,739,395 | 6/1973 | King | 346/75 |
| 3,769,627 | 10/1973 | Stone | 346/75 |
| 3,797,022 | 3/1974 | Beam et al. | 346/75 |
| 3,805,273 | 4/1974 | Brady et al. | 346/75 |
| 4,010,477 | 3/1977 | Frey | 346/75 |

*Primary Examiner*—George H. Miller, Jr.
*Attorney, Agent, or Firm*—Biebel, French & Nauman

[57] ABSTRACT

An ink jet printer produces a row of drop streams directed at a print receiving medium which moves in a direction oblique to the row. Drops in the drop streams are charged and deflection electrodes provide a series of parallel deflection fields substantially perpendicular to the row of drop streams. A catcher is provided for catching drops which are directed in catch trajectories. The deflection fields are controlled such that selected ones of the drops are directed into catch trajectories and other ones of the drops are directed into print trajectories, the drops in the print trajectories striking the print receiving medium and forming a print image.

23 Claims, 13 Drawing Figures

INK JET PRINTER HAVING PLURAL PARALLEL DEFLECTION FIELDS

BACKGROUND OF THE INVENTION

The present invention relates to ink jet printing devices and, more particularly, to a method and apparatus for controlling with a high degree of accuracy the deposit of ink drops on a print receiving medium.

Jet drop recorders, such as that shown in U.S. Pat. No. 3,701,998, issued Oct. 31, 1972, to Mathis, have included one or more rows of orifices which receive electrically conductive recording fluid, such as a water base ink, from a pressurized fluid manifold and eject the fluid in parallel fluid filaments. Mechanical stimulation is applied to the structure or fluid coupled to the orifices, causing the filaments each to disintegrate into a plurality of drops.

Graphic reproduction in recorders of this type has been accomplished by selectively charging some of the drops in each of the streams. The drops then pass through an electrical field which deflects the charged drops such that they strike a drop catching device. The uncharged drops pass unaffected through the deflection field however, and are deposited on a moving web of paper or other material. Although the direction of web movement has generally been substantially perpendicular to the row or rows of drop streams, web movement which is at an inclined angle with respect to the row or rows of drop streams has also been used to increase the effective drop density across the width of the web, as shown in U.S. Pat. No. 4,010,477, issued Mar. 1, 1977, to Frey, and assigned to the assignee of the present invention. Rows of drop streams inclined to the direction of web movement are also shown in "Ink Jet Head," by Krause, IBM Technical Disclosure Bulletin, Volume 19, Number 8, January 1977, pages 3216 and 3217.

One method of charging drops in a recorder is to apply charge control signals to charging electrodes positioned near the drop streams, adjacent the point at which the drops are formed. As the drops separate from their parent fluid filaments, they carry a portion of the charge induced by the charging electrodes. The static deflection field which separates the charged drops from the uncharged drops has been generated by applying a constant potential difference between one or more catchers and a deflection ribbon. U.S. Pat. No. 3,787,882, issued Jan. 12, 1974, to Cassill, discloses a thin deflection ribbon which is positioned between and parallel to two rows of parallel drop streams, with catchers positioned outwardly of the drop streams. Charged drops in each drop stream will be deflected away from the deflection ribbon and toward the appropriate catcher.

One problem with jet printers of this type has been attaining sufficient image resolution. Since a discrete number of drops are applied to form the printed images, it is clear that an increase in the number of drops deposited per unit area of print medium, and a corresponding increase in data handling capability, will permit improvement in image definition. If, however, only one print position per print line is serviced by each orifice, the number of drops per unit width and, therefore, the resolution of an image in the direction transverse to the print web, are limited by the minimum dimensions required between each orifice. The approach taken in the Mathis device is to provide two staggered rows of drop streams. Charging of the drops in the two rows is timed such that printing from the two rows of streams is in registration.

The head assembly disclosed in the Frey patent includes a number of rows of jet streams which are arranged along angularly oriented placement lines, thus increasing the effective density across the web. The head assembly shown in Krause combines these approaches by providing two interlaced rows of drop streams positioned obliquely with respect to the direction of web movement.

Another approach to the problem of resolution is shown in U.S. Pat. No. 3,373,437, issued Mar. 12, 1968, to Sweet et al and assigned to the assignee of the present invention. FIG. 6 of the Sweet reference shows a number of jets in a single row in a converging array. The interdrop spacing is less, therefore, than the water-jet spacing. The configuration is disadvantageous, however, in that the distance travelled by the drops in each stream will be slightly different, complicating the timing of data severely. Additionally, it is somewhat difficult to insure that the streams will continue to converge as they approach the web.

In U.S. Pat. No. RE 28,219, issued Oct. 29, 1974, to Taylor et al, and assigned to the assignee of the present invention, printing by separate ink jet printer arrays in a tandem relation, with each successive array being laterally offset, is shown. The orifices are positioned such that they interlace to provide print capability across the entire web.

Another approach taken to increase drop density has been to use a single jet to service a number of print positions across the print web. U.S. Pat. No. 3,739,395, issued June 12, 1973, to King, and assigned to the assignee of the present invention, discloses a printer in which uncharged drops are caught while the charged drops from each orifice are deflected by two sets of deflection electrodes to a plurality of discrete print positions on the moving web. Deflection of the drops is either perpendicular or parallel to the direction of web movement, or both, covering either a one line matrix or a multiple line matrix across the web. The minimum distance between jet orifices is somewhat greater in the King device than in previously mentioned devices, however, since deflection electrodes must be positioned on all sides of each orifice.

In U.S. Pat. No. 3,972,052, issued July 27, 1976, to Atumi et al, an ink jet printing device is disclosed in which a single jet scans a plurality of print lines in succession. Each scanning operation is controlled by two pairs of deflection electrodes which provide parallel deflection fields through which the ink drops pass in succession. Identical ramp deflection voltages are applied to the deflection electrodes, with the deflection voltage applied to the second pair of deflection electrodes being delayed with respect to the deflection voltage applied to the first pair. Drops are selectively charged in accordance with the data to be printed. The deflection potentials, while varying cyclically to effectuate the scanning of the print lines, are not varied in accordance with the print image data.

U.S. Pat. No. 3,871,004, issued Mar. 11, 1975, to Rittberg, discloses a printing head which moves transversely across a print web. Individual deflection electrodes are positioned adjacent each orifice to deflect drops to one of three print positions. Deflection of the drops is in a direction which is oblique to the direction of head movement. The orifices are positioned in a row perpendicular to the direction of head movement.

The concept of increasing image resolution by increasing the number of print positions serviced by a single ink jet is also shown in U.S. Pat. No. 3,813,676, issued May 28, 1974, to Wolfe; U.S. Pat. No. 3,769,631, issued Oct. 30, 1973, to Hill et al; and U.S. Pat. No. 3,298,030, issued Jan. 10, 1967, to Lewis et al. These patents show print arrangements in which a single jet prints an entire line of characters as the print web is moved past the jet.

Another problem which has become increasingly severe as inter-jet distance has been reduced is that of cross talk between charge electrodes. In systems in which drops are selectively charged, it is important that such charging be accomplished accurately. One source of inadvertent charging is the drops which have previously been formed in the drop streams. Assuming a drop in a stream carries a charge, the subsequent drop in the stream will be formed in sufficient proximity to the charged drop that a slight charge of opposite polarity may be induced. Such drop to drop interference has been recognized as a significant problem and has been treated in several patents such as U.S. Pat. No. 3,828,354, issued Aug. 6, 1974, to Hilton; U.S. Pat. No. 3,512,173, issued May 12, 1970, to Damouth; U.S. Pat. No. 3,827,057, issued July 30, 1974, to Bischoff et al; U.S. Pat. No. 3,789,422, issued Jan. 29, 1974, to Haskell et al; U.S. Pat. No. 3,833,910, issued Sept. 3, 1974, to Chen; and U.S. Pat. No. 3,631,511, issued Dec. 28, 1971, to Keur.

In U.S. Pat. No. 3,656,171, issued Apr. 11, 1972, to Robertson, the problem of cross talk between adjacent jets is also recognized. Inter-jet cross talk occurs when the charge electrodes associated with one jet affect the charging of drops in adjacent jets. In the Robertson U.S. Pat. No. 3,656,171 patent the nature of the device disclosed is such that the effect of the cross talk is minimized and no compensation is provided. Minimization of cross talk is accomplished by requiring each charged drop to induce a charge in an adjacent deflection plate, with the induced charge setting up a weak deflection field. Although reducing substantially the effect of inaccuracy in drop charging, the deflection arrangement of the Robertson U.S. Pat. No. 3,656,171 device is limited in the amount of deflection it can provide. The deflection plate must be positioned extremely close to the jets with the result that dimensional variations become undesirably critical.

In U.S. Pat. No. 3,604,980, issued Sept. 14, 1971, to Robertson, inter-jet cross talk is recognized as a problem with the suggested solution being an increase in shielding between charging electrodes. As the inter-jet distance is reduced, however, such shielding becomes less effective.

There is a need, therefore, for an ink jet recording device which provides substantially increased print density and, further, which reduces errors resulting from drop charging inaccuracies.

SUMMARY OF THE INVENTION

An ink jet printer includes means for generating a row of drop streams and means for transporting the print receiving medium past the row of drop streams. Means are provided for charging the drops in the drop streams. Deflection electrode means generate parallel deflection fields through which the drop streams pass in succession. Catcher means extend parallel to the row and catch drops which are in trajectories. Control means are provided for controlling the deflection fields generated by the deflection electrode means such that selected ones of the drops will be directed into catch trajectories, and other ones of the drops will be directed into print trajectories and strike the print receiving medium to produce a print image.

The ink jet printer may in one embodiment further comprise a second row of drop streams which are positioned adjacent and parallel to the first row of drop streams. A deflection ribbon may be positioned between and parallel to the rows of drop streams and a plurality of deflection electrodes positioned along each of the drop streams for generating a plurality of deflection fields in conjunction with the deflection ribbon.

In one embodiment of the present invention, each jet will service only a single print position on the web. A plurality of deflection electrodes are positioned along the path of each of the drop streams and a selected deflection potential is applied in succession to each of the deflection electrodes adjacent a drop stream in synchonism with the movement therepast of charged drops. The deflection potential will cause the selected drops to be directed into a catch trajectory while the remaining drops will be unaffected and will strike the print receiving medium. The means for charging may charge all of the drops in the drop streams or, alternatively, may charge drops in the drop streams only selectively.

In another embodiment of the invention the row of drop streams may be oblique to the direction of movement of the print receiving medium and the deflection electrode means includes a plurality of deflection electrodes positioned along the path of each of the drop streams. The control means comprises a means for applying a selected deflection potential in succession to each deflection electrode adjacent the drop streams in synchronism with the movement therepast of charged drops such that charged drops in the drop streams may be deflected perpendicular to the row into selected ones of a plurality of print trajectories. In another embodiment, the control means includes means for applying deflection potentials only to predetermined ones of the deflection electrodes as charged drops pass adjacent the electrodes such that charged drops will be directed into selected ones of a plurality of print trajectories.

The method of the present invention includes the steps of charging the drops in the drop streams and generating a plurality of parallel electrical deflection fields. The fields are generated substantially perpendicular to each drop stream by applying deflection potentials to the electrodes positioned along the stream. The drops in the drop streams pass adjacent the electrodes and traverse one or more of the fields whereby they are directed into catch or print trajectories.

Accordingly, it is an object of the present invention to provide an ink jet printing device having a plurality of jet streams directed at a moving print receiving medium and to provide for deflection of selected drops in the streams by means of a plurality of parallel deflection fields through which the jet streams pass in succession; to provide such an ink jet printing device in which a plurality of deflection electrodes are positioned adjacent the path of each of the drop streams; to provide such an ink jet printing device in which the jet streams flow a row which is oblique to the direction of movement of the medium and in which predetermined potentials are supplied to each of said deflection electrodes such that the associated jet stream is directed to predetermined print positions; to provide such an ink jet printing device in which a potential is applied to each of the deflection electrodes in succession at a rate coincident with the movement of a drop past the electrodes; and to provide such a device in which drop density is increased and the effects of inadvertent drop charging are minimized.

Other objects and advantages of the present invention will be apparent from the following description, the accompanying drawings and the appended claims.

DETAILED DESCRIPTION OF THE PREFERRED EMBODIMENTS

Figure 1:
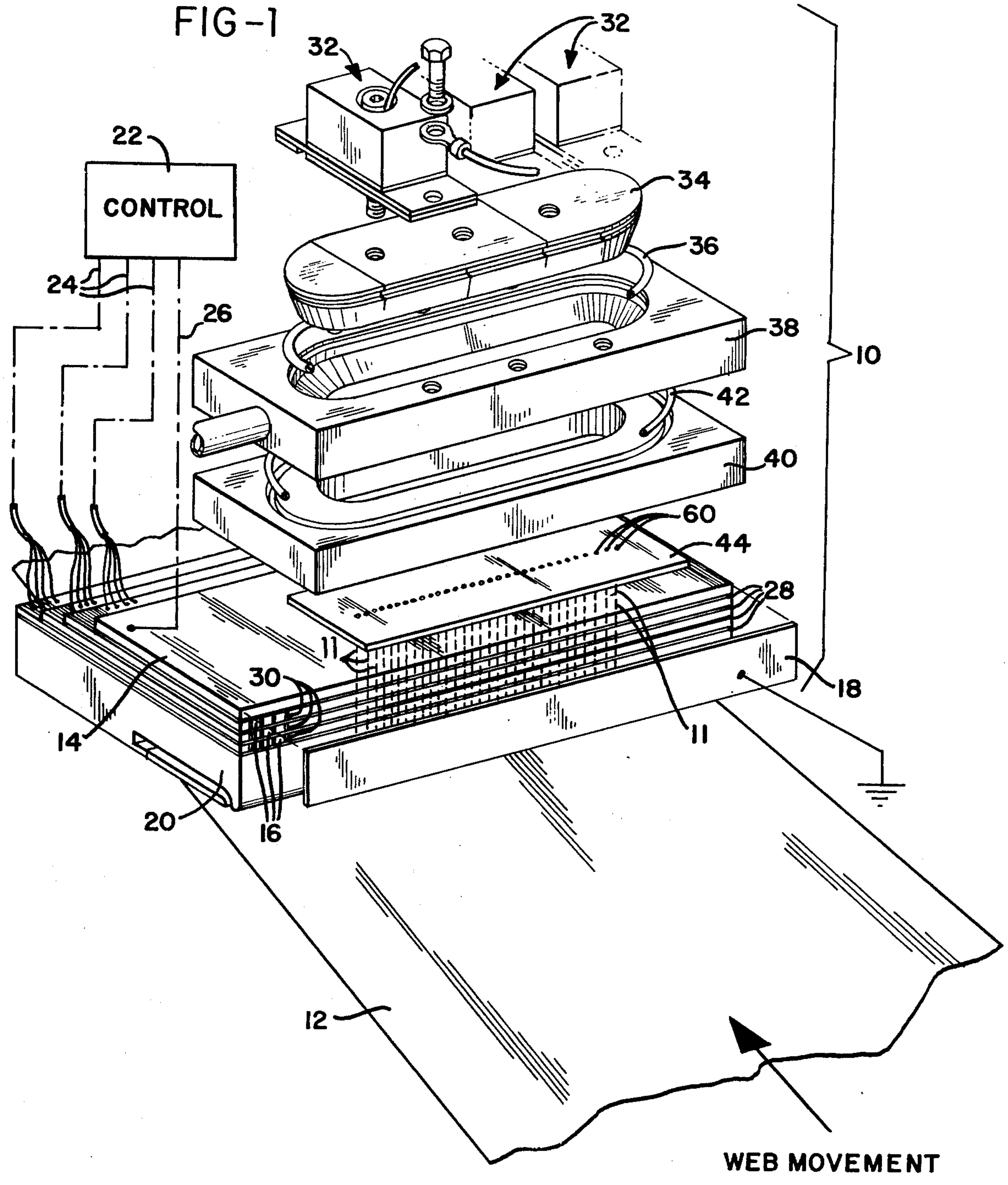
FIG. 1 is a diagrammatic exploded perspective view of one embodiment of the present invention.

The present invention relates to an ink jet printer and a method of printing text and graphics on a moving web of paper or other print receiving medium. FIG. 1 is a diagrammatic exploded perspective view illustrating a printer of the present invention. The printer includes a means 10 for generating a row of drop streams indicated diagrammatically by dashed lines 11. The print receiving medium 12 is transported in a direction which is oblique to the row of drop streams. A charge electrode 14 provides a means for charging the drops in the drop streams. A plurality of deflection electrodes 16 positioned beneath the charge electrode 14 provide a deflection means for generating parallel deflection fields in a direction which is substantially perpendicular to the row of drop streams. Grounded plate 18 coacts with electrodes 16 in providing the deflection fields required. It should be understood that although only a few deflection electrodes are illustrated for the sake of clarity, similar deflection electrodes are positioned along the entire row of drop streams.

Catcher means 20 extends parallel to the row of drop streams and is positioned to catch drops which are in catch trajectories. Appropriate data processing control 22, to be described more completely below, provides a means for controlling the deflection fields generated by the deflection electrodes 16 such that selected ones of the drops will be directed into catch trajectories and other ones of the drops will be directed into print trajectories. Those drops in print trajectories will strike the print web 12 at desired print positions. Appropriate conductor bundles 24 provide the desired deflection potentials from control 22 to each of the deflection electrodes 16.

In the embodiment shown in FIG. 1, all drops are to be charged by the charge electrode 14 and therefore a single line 26 provides a constant charging potential for the electrode. Charging electrode 14 and deflection electrodes 16 are configured in a sandwich arrangement with sheets of insulating material 28 providing electrical insulation therebetween. Additionally, each of the deflection electrodes 16 is isolated from other deflection electrodes adjacent to it by insulator strips 30.

The basic components used to generate the row of drop streams include a plurality of transducer assemblies 32, a piston member 34, a resilient O-ring 36, a transducer holder 38, a manifold block 40 with an intervening sealing O-ring 42, and an orifice plate 44.

Figure 2:
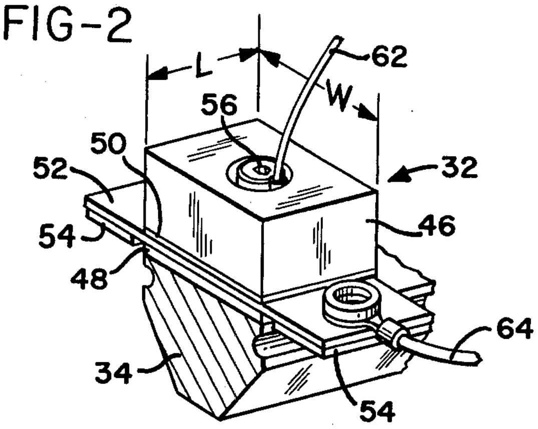
FIG. 2 is an enlarged perspective of a portion of the transducer assembly of FIG. 1 with portions broken away and in section.

As seen in FIG. 2, each transducer assembly 32 is composed of an upper backing plate 46, a pair of piezoelectric transducers 48 and 50 which are preferably thickness mode ceramic transducers, and a transducer assembly mounting or attaching plate 52 which functions as an electrode for transducers 48 and 50. Resilient mounting members 54 also act as electrical insulators. The transducer assembly is secured together by mounting the assembly on the piston member 34 with bolt 56 which extends through the transducer assembly into the piston member. The transducers 48 and 50 and upper backing member 46 are substantially coextensive and in parallel vertical alignment, with the width W being substantially coextensive with the width of the piston member 34.

The width W and length L measured longitudinally of the piston member 34 are both preferably substantially less than one-half of the wavelength of flexure waves in the transducer assembly at the maximum operating frequency, as previously mentioned, in order to minimize the interference due to standing waves of significant amplitude.

Transducers 48 and 50 are relatively positioned so that their polarity is opposing. The resilient mounting members 54 can be of any desired material and need only be of minimum thickness, so long as some resiliency is provided sufficient to prevent substantial transfer of vibration from the attaching plate 52 to the upper manifold 38.

Figure 3:
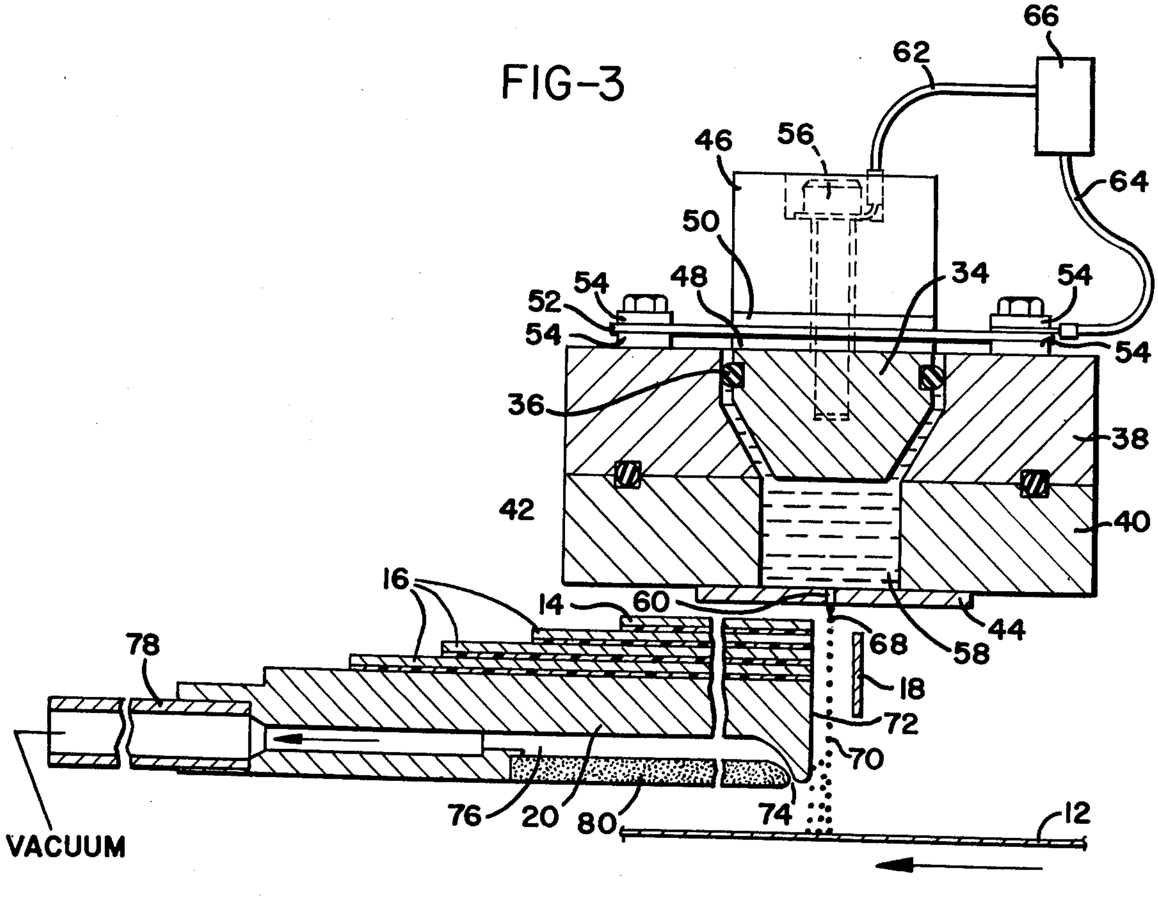
FIG. 3 is a sectional view through the printer of FIG. 1 as seen looking generally left to right in FIG. 1.

The piston member 34 is resiliently surrounded by O-ring 42 which permits piston member to move vertically due to excitation of transducers 48 and 50 as described below. As seen in FIG. 3, O-ring 42 provides a seal between the outer peripheral side portion of piston member 34 and the adjacent side portions of the walls of transducer holder 38 to prevent leakage of print fluid 58 from the manifold.

Orifice plate 44 is of relatively rigid construction and is attached by adhesive, soldering or bolting to manifold block 40. Orifice plate 44 defines a row of jet orifices 60 which extend along the length of the orifice plate 44 symmetrically below the lower portion of piston member 34.

All transducer assemblies of the transducer array are connected by wires 62 and 64 to a common signal generating device 66 so that they are excited at substantially the same frequency in phase. The crystals 48 and 50 apply equal forces against attaching member 52, causing the backing member 46 and the piston member 34 to be displaced in opposite directions. As the piston member 34 is moved up and down by the combined action of the transducers, it generates plane waves in the liquid 58, which waves are parallel to the orifice plate 44. The jet filaments 68, which extend through the orifices 60, receive the plane wave disturbances and break into uniform drops in accordance with the well known Rayleigh criteria. The drop generating configuration shown in FIGS. 1–3 is one of many drop generating techniques which may be used in the printer of the present invention. This drop generating arrangement is the subject of U.S. patent application Ser. No. 618,608, filed July 18, 1977 and assigned to the assignee of the present invention.

The drops in each drop stream which are formed by orifices 60 are charged by the charge electrode 14. Each drop stream has associated with it a number of deflection electrodes which are positioned adjacent the stream and which are energized to provide a plurality of electrical deflection fields in conjunction with grounded plate 18. As seen in FIG. 3, selected ones of the drops 70 in the drop streams will be deflected and will strike the face 72 of catcher 20. The drops which are caught by catcher 20 will travel down the face 72 and will be ingested into the catcher 20 through opening 74 into chamber 76. Vacuum supply line 78 supplies a vacuum to chamber 76 and carries away the ingested ink drops. The drops ingested by line 78 are supplied to a filtration system and then returned to the printer for reuse. Portion 80 of the catcher may be formed of a porous material so that any drops collecting on the bottom surface thereof will be ingested directly through the material into the chamber 76. As seen in FIG. 3, other ones of the drops 70 will pass between the deflection electrodes and plate 18 and will be deposited on print web 12 at one or more print positions on the web.

Figure 4:
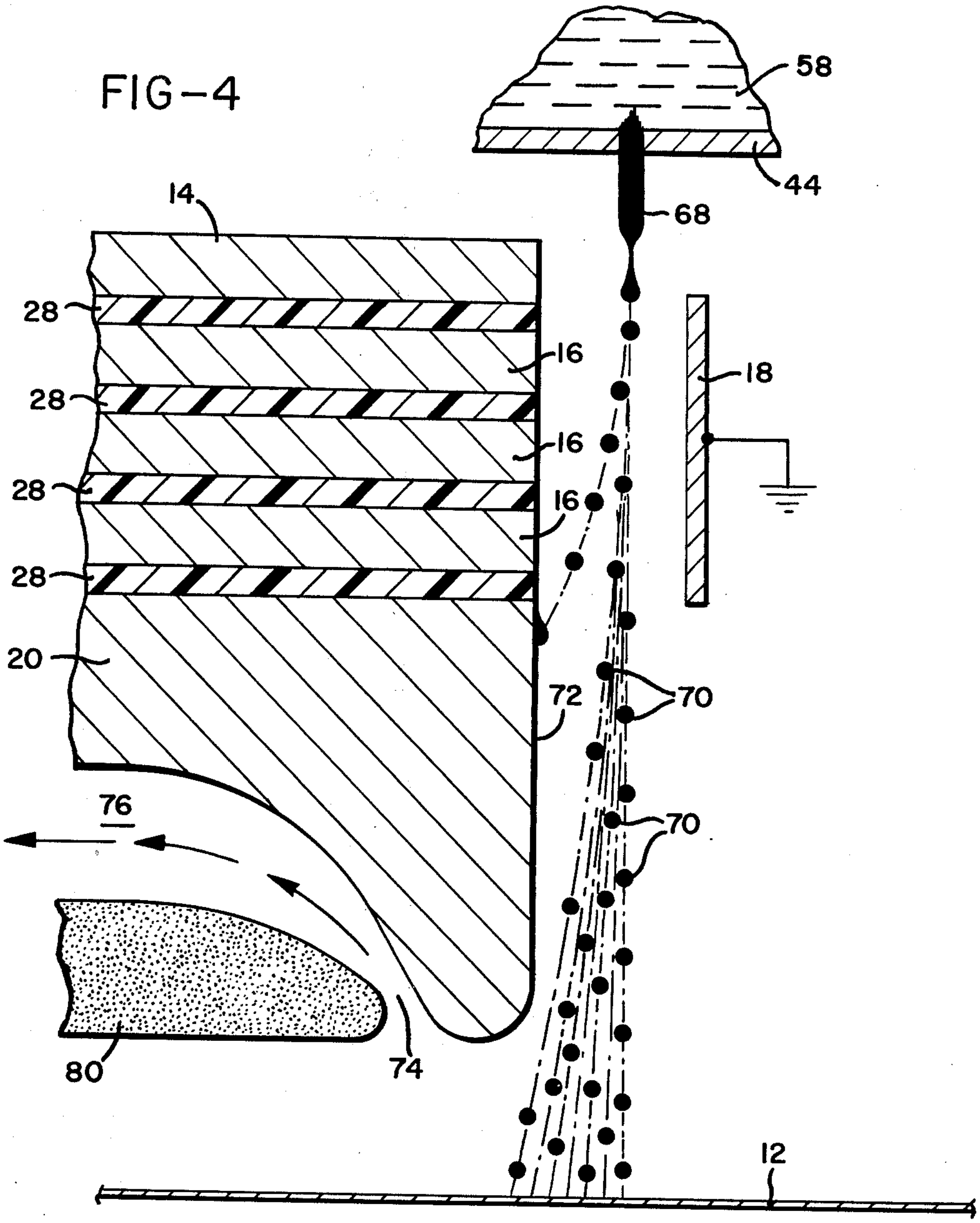
FIG. 4 is an enlarged sectional view showing a portion of FIG. 3 in greater detail.

FIG. 4 illustrates this selective deflection process in greater detail. Charging electrode 14 is positioned adjacent filament 68 and induces a charge on the tip of the filament which is opposite in polarity to the potential on electrode 14. When a drop 70 is formed from the end of filament 68, it carries with it this induced charge. Deflection electrodes 16 have deflection potentials applied to them selectively and in sequence as each successive drop passes adjacent the electrodes. The potentials on electrodes 16 produce electric fields between the electrodes 16 and grounded plate 18. These deflection fields will result in drops 70 being deflected into a number of print trajectories such that they strike the web at one of a number of print positions. A single jet may therefore service a number of print positions on the web and thereby increase the effective drop density on the web without a decrease in the inter-jet distance along the print bar. It should be noted that the direction of deflection of the drops will be normal to the row of drop streams. In order to provide for a number of print positions across the width of the web being serviced by a single jet, therefore, the print head will necessarily be skewed with respect to the direction of web movement.

Figure 5:
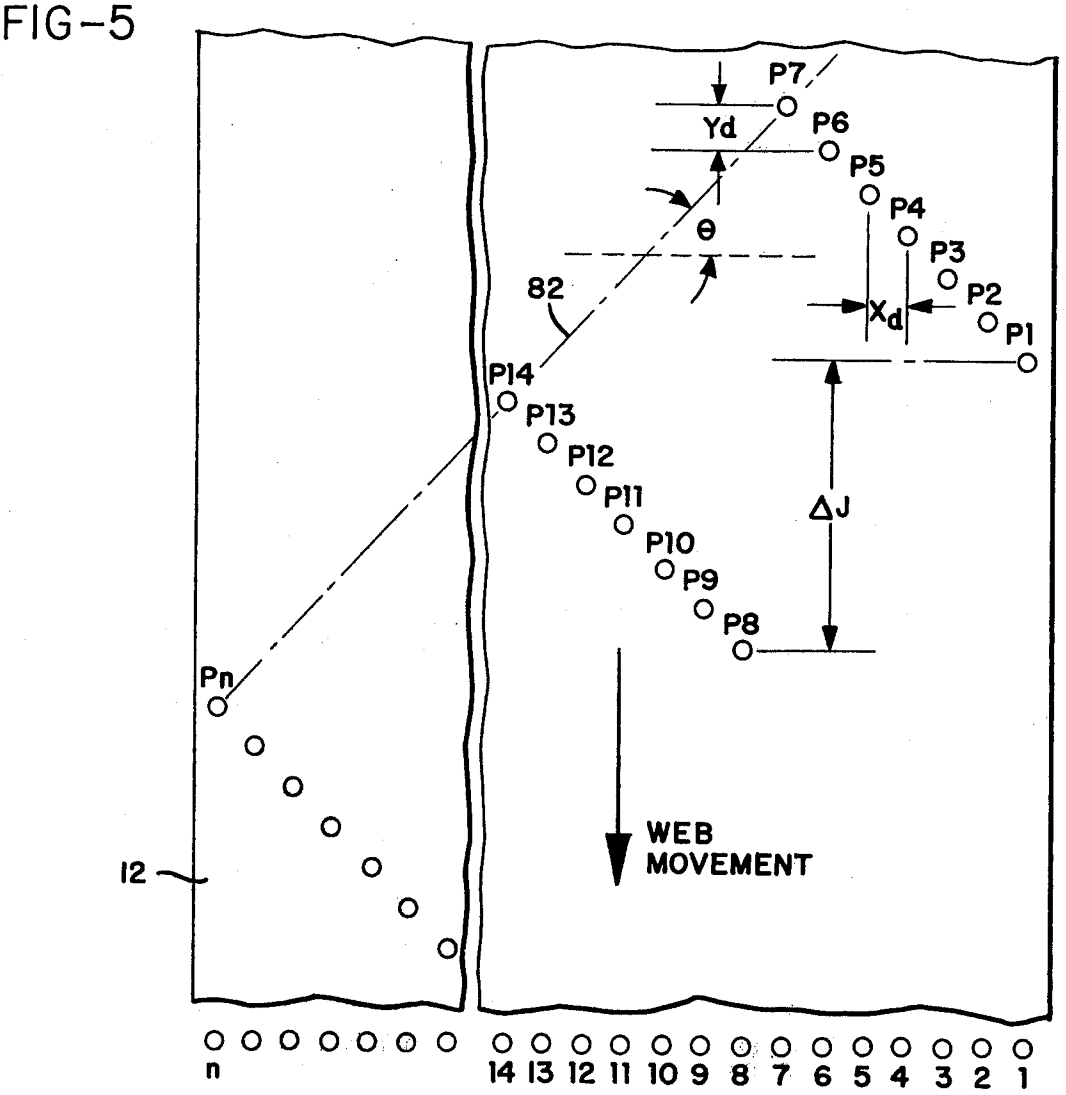
FIG. 5 is a diagrammatic representation of a print receiving medium as seen from above illustrating the print positions.

FIG. 5 represents diagrammatically the relative point at which the drops in print trajectories will strike the print web 12. Dashed lines 82 represents the position of the row of drop streams with respect to the web 12. If undeflected by the deflection electrode 16, drops from the drop streams would fall at print positions on this line. The arrangement illustrated is one in which each jet services seven print positions. The jet furthest to the right will service print positions $P_1$–$P_7$; the second jet from the right will service positions $P_8$–$P_{14}$; etc. When the proper deflection geometry and inter-jet spacing is provided, drops may be directed to a plurality of evenly spaced print positions across the entire width of the print web. Although seven print positions per jet are illustrated, the servicing of fewer print positions per jet may provide a sufficient increase in image detail for some purposes while requiring less of an increase in control circuitry.

As seen in FIG. 5, the row of jets is inclined at an angle $\theta$ with respect to a transverse reference line across the web. The longitudinal displacement between print positions is equal to $Y_d$, while transverse displacement between print positions is equal to $X_d$. It is apparent that the time $t_O$ required to generate one drop is $$t_O = 1/f_O,$$

where $t_O$ = time to generate each ink drop, and $f_O$ = the frequency at which drops are generated from each jet.

Also, the time required to print a "dot" or print position $$t_p = N/f_O,$$

where $t_p$ = time to print each "dot", and

N = number of drops per dot.

Assuming that resolution in the longitudinal direction is to equal resolution in the transverse direction, if each jet is deflected to print in M different print positions, the web must not move more than one resolution element ($X_d$) in the time required to print all M dots:

$$V_{wmax} = X_d f_O/MN,$$

where $V_{mwax}$ = maximum print web velocity, and

M = number of print positions serviced by each jet.

Figure 6:
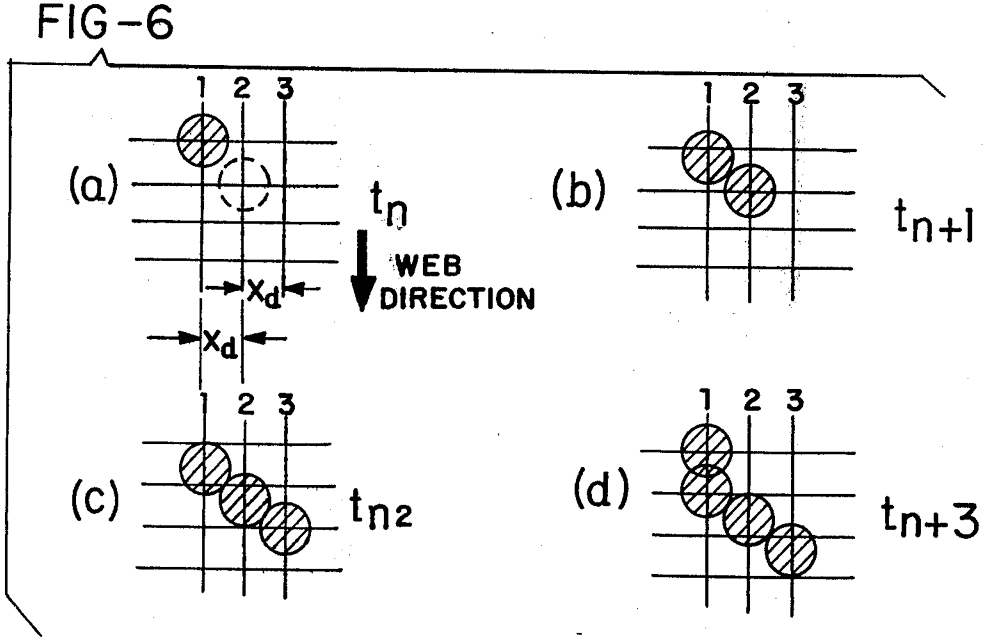
FIGS. 6(a)-6(d) illustrate the timing considerations for drop deposit.

Reference is now made to FIGS. 6(*a*)–6(*d*), which illustrate printing with three print positions being serviced by a single jet. It is apparent that since the web is moving and since each of the three dots is printed in succession at different times, that the web will have moved some distance between the printing of each dot. In FIG. 6(*a*) print position 1 is printed at time $t_n$. At time $t_{n+1}$, print position 2 is printed. Note that the print position 1 dot previously printed has now moved by ⅓ of the basic resolution element (equal to $X_d$) since it was printed at time $t_n$. At time $t_{n+2}$, as seen in FIG. 6(*c*), the print position 3 dot is printed. At this time the print position 1 dot has moved ⅔ of a basic resolution element while the print position 2 has moved ⅓ of a basic resolution element. At time $t_{n+3}$, the print position 1 is again serviced.

This sequence of print matrix diagrams illustrates the conditions for a bar which is inclined at 45° while the web is running at maximum velocity. This arrangement will not provide a square matrix of print positions because, as seen in FIG. 6(*d*), the line of jet drops will be skewed from the horizontal. The inclination of the bar can be changed, however, to compensate for this error. The orientation of the bar is adjusted so that the vertical deflection is increased by the amount that each drop moves during a print time period ($t_p$). The angle of the print bar with respect to a transverse reference line is $$\theta = \tan(-1\, X_d/Y_d).$$

To correct for the velocity error, $$Y_d = nX_d + V_w t_p,$$

where $Y_d$ = vertical deflection distance, $n$ = any integer including 0; number of integer data delays assigned into the system, and $V_w$ = any fixed web velocity not to exceed $V_{wmax}$.

When a data delay is introduced, successively serviced print positions will form a part of successive transverse lines of print information.

When a system operates at its maximum web velocity, this equation reduces to $$Y_d = X_d(n+1/M)$$

and the equation for $\theta$ becomes $$\theta = \tan^{-1}(1/n+1/M)$$

Applying this equation, the following configurations would result:

1. If no data delay is provided for the dots printed by any given jet, the inclination of the row of jets would be 63.43° for two position deflection and 71.56° for three position deflection. To print a 8.5 inch width with two position deflection would require a 19 inch bar length. For three position deflection a 26.8 inch bar would be required.
2. If a one increment data delay is designed into each deflected dot, an inclination of 33.69° would be required for two position deflection and an inclination of 36.87° would be required for three position deflection. To print an 8.5 inch width with two position deflection would require a bar length of 10.22 inches while printing an 8.5 inch width with three position deflection would require a 10.62 inch bar length. With the inclination of 33.69° in a two position system, the jet density across the web is effectively increased by a factor of 1.25.

Similarly, an inclination of 36.87° will result in the effective jet spacing being reduced by a factor of 1.25. With a 120 jet/inch density along the row of jets, the two position system will provide an effective resolution of 288 print positions/inch while the three position system will have an effective resolution of 450 print positions/inch.

The angle of inclination of the bar, even in a system operating at maximum web speed, may be varied without affecting the quality of the print image unduly for many applications.

The above discussion assumes a plurality of print positions in a square matrix. Such a square matrix arrangement is not required for all print applications, however, since print quality may be acceptable with drop position errors resulting from a skewed print position matrix when a high resolution print image is not desired.

Figure 7:
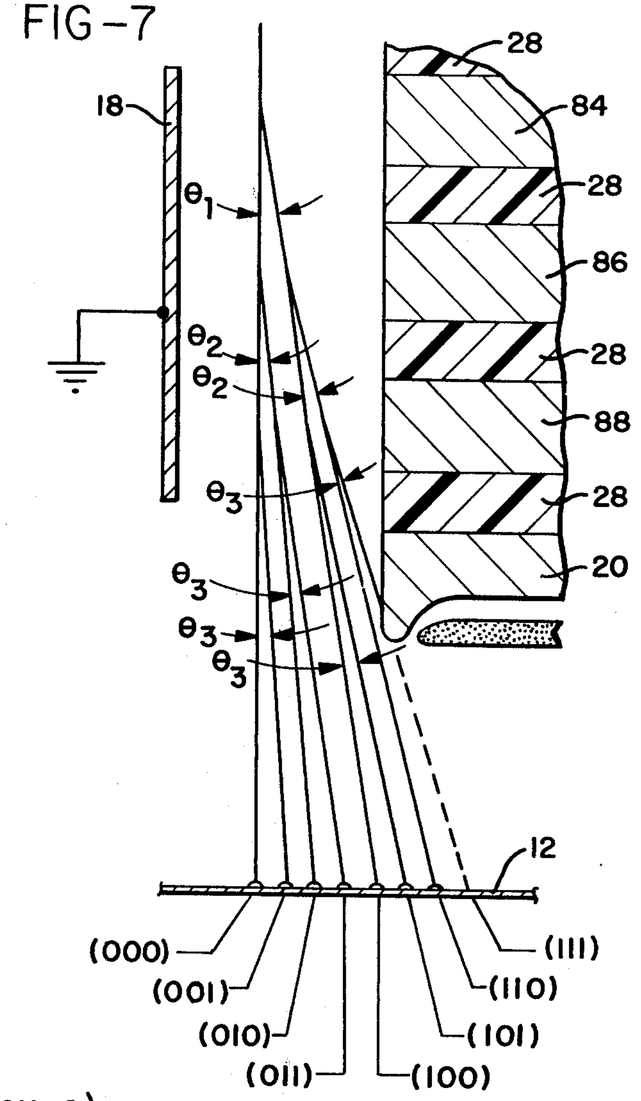
FIGS. 7 and 8 illustrate a deflection arrangement for one embodiment of the present invention.
Figure 8:
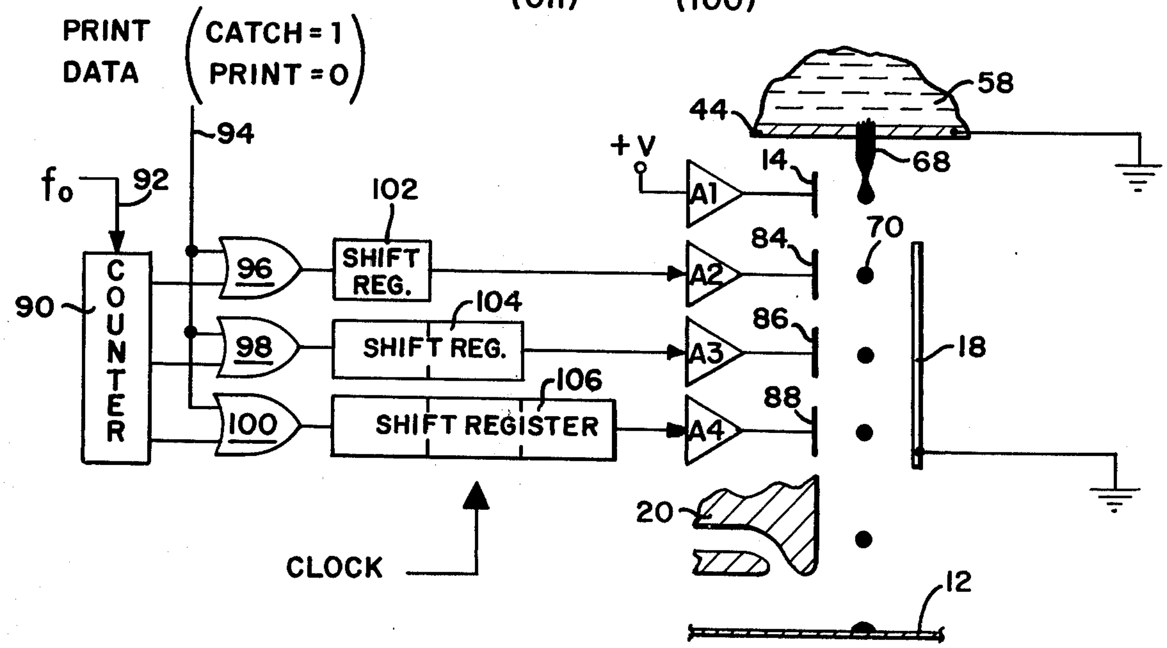

Reference is now made to FIGS. 7 and 8 which illustrate one configuration for providing multiple print position deflection using a plurality of deflection electrodes. Although the illustrated configuration provides for deflection to seven print positions, it should be understood that a similar arrangement could be provided for deflection to two, three or more print positions. As seen in FIG. 7, when deflection electrode 84 is energized, the trajectory of a drop passing adjacent to the deflection electrode will be altered by an angle $\theta_1$. Similarly, deflection electrode 86, when energized, is provided with a potential which will result in deflection of a passing drop by an angle of $\theta_2$. Finally, the energization potential of deflection electrode 88 is set such that when the electrode 88 is energized, a trajectory alteration of angle $\theta_3$ will result. Generally, $\theta_1 > \theta_2 > \theta_3$.

As will be observed deflection to one of the several print positions on web 12 may be controlled by energization of one or more of the electrodes 84, 86, and 88. Assuming that electrode 88 corresponds to the least significant bit position, electrode 86 corresponds to the second least significant bit position, and electrode 84 corresponds to the most significant bit position, the energization of various combinations of these electrodes will result in a drop being deflected to the positions as indicated by the 3 bit binary numbers corresponding to each position. It should be noted that each successive print position has associated therewith a binary number which is increased by one from the previous print position.

Repetitively scanning from print position 000 to print position 110, therefore, may be accomplished quite simply by the use of a count-to-6 counter 90, as shown in FIG. 8. In the illustrated circuit, it is assumed that only one drop will be deposited at each print position. The counter 90 will therefore be incremented by a pulse train on line 92 which is equal in frequency to the rate at which a drop moves from one deflection electrode to the next. Each of the drops 70 will receive a charge from charging electrode 14. Print image data signals are applied to the circuit via line 94, with "1" indicating that the drop is to be caught and a "0" indicating that the drop is to be printed at its print position. Note that the catch trajectory is defined by the electrode energization pattern 111 (FIG. 7). When a "1" is applied to line 94, therefore, OR gates 96, 98, 100 will apply binary ones to the first stages of shift registers 102, 104 and 106, respectively. The first stages of the shift registers will therefore receive a binary indication of the print position or catch position to which the drop is to be directed.

Shift registers 102, 104 and 106 will be shifted at a rate which corresponds to the speed at which a drop 70 passes each successive deflection electrode. The shift registers are provided with successively greater delays so that the deflection information will be available to each deflection electrode as the drop to which it pertains passes adjacent to the electrode. Each of the electrodes 14, 84, 86, and 88 is supplied with an appropriate potential by amplifiers A1–A4. The outputs of the amplifiers are adjusted to provide drop trajectories deflection angles as illustrated in FIG. 7.

The timing of the pulse train applied to line 92 and the print data on line 94 may be such that the appropriate deflection signals are applied to the deflection electrodes when the drops 70 are in registration with those electrodes. The phase relationship between the stimulation signal and the pulse train and data may be adjusted to produce the desired results. A photoelectric drop detection arrangement may be provided on one of the jets in the row to monitor drop generation and provide a signal which can be used for phase adjustment. Alternatively, asynchronous printing may be accomplished in which the application of data to the electrodes is timed but in which no attempt is made to detect when a drop is precisely aligned with the electrodes. The errors which result may be neglected for some applications. Thus the control circuit of FIG. 8 illustrates a means for applying deflection potentials only to predetermined ones of the deflection electrodes as charged drops pass adjacent those electrodes such that the charged drops will be deflected into selected ones of a plurality of print trajectories.

Figure 9:
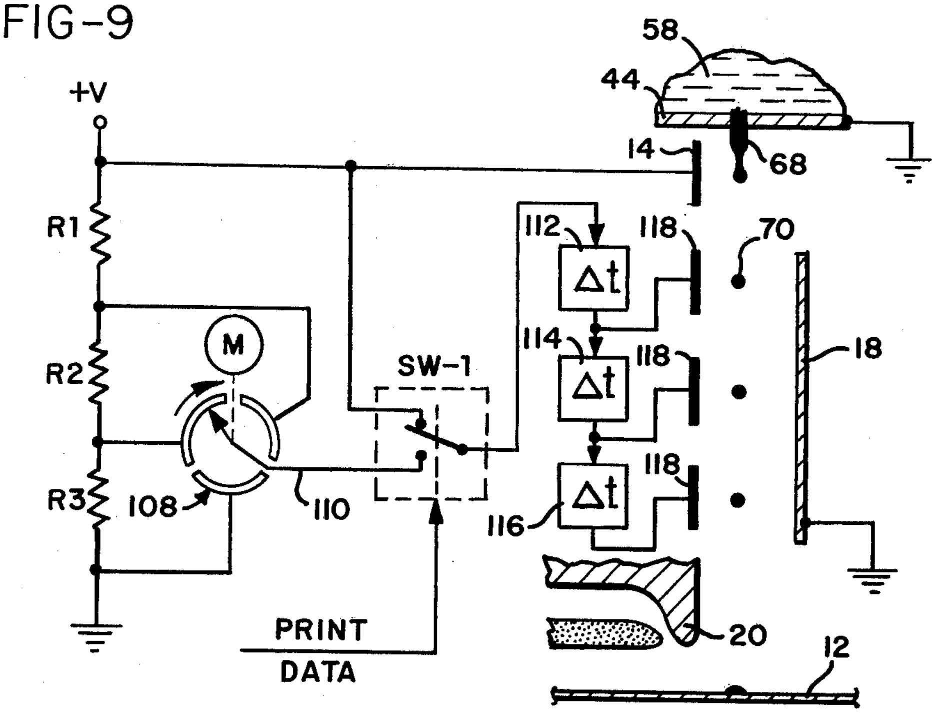
FIG. 9 illustrates a deflection arrangement for an alternative embodiment of the invention.

Reference is now made to FIG. 9 of the drawings in which drops from each jet are directed to a plurality of print positions. A predetermined deflection potential is associated with each of the print positions and this potential will be applied to each of the deflection electrodes in succession when a drop is to be deflected into the associated print position. Thus a drop which is to be deflected to print position $P_1$ will experience a field adjacent each electrode resulting from the application of a potential of E1 to each electrode. A drop to be deflected to print position $P_2$, correspondingly, will experience a field adjacent each electrode resulting from the application of a potential of E2 to each deflection electrode in succession.

All drops will be charged by a potential +V which is applied to charge electrode 14. Print data in binary form is applied to switch SW1, causing the switch to be switched to one of its switch positions. It should be understood that switch SW1 will generally comprise a semi-conductor switching device and is shown as a mechanical switch here only for purposes of simplification. A voltage divider including resistors R1, R2, and R3, and motor driven rotary switch 108 provides a staircase-shaped waveform to line 110. The waveform on line 110 will repetitively assume three potential levels in succession. Drops may be deflected to three print positions, therefore. The speed of rotation of switch 108 is set such that increases in the potential on line 110 occur at a rate equal to the drop stimulation frequency (assuming one drop is deposited for each print position). The proper phase relationship between the waveform on line 110 and drop generation will also have to be maintained.

The switch SW1 will be switched to its lower position when a drop is to be printed at a print position and the potential associated with the print position will be applied to delay 112 and thence to delays 114 and 116. Delays 112, 114 and 116 are typically analog delay devices of known design. The time delays will be set such that the deflection potential applied to delay 112 will follow drops 70 in a manner analogous to a traveling wave at the same rate at which drops 70 descend toward web 12. Should it be desired to catch a drop 70, switch SW1 will be switched into its upper position and a maximum deflection potential applied to each of the deflection electrodes 118 in sequence; the deflected drop 70 will therefore be caught by catcher 20. Thus it can be seen that the circuit of FIG. 9 provides a means for applying a selected deflection potential in succession to each deflection electrode adjacent the drop stream in synchronism with the movement of charged drops therepast such that charged drops in the drop streams will be deflected into selected ones of a plurality of print trajectories.

Figure 10:
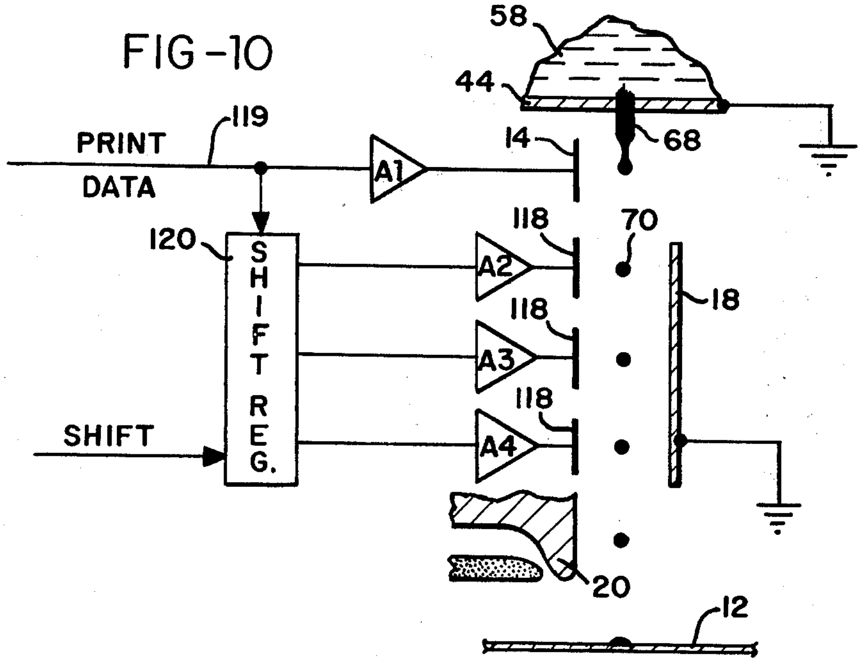
FIG. 10 illustrates a deflection configuration for another embodiment of the present invention.

Reference is now made to FIG. 10 illustrating an ink jet printer in which only one print position is serviced by each jet. The jets may be positioned along a line which is transverse to the direction of print web movement or, alternatively, the row of jets may be skewed to improve the effective jet density. Only the drops which are to be deflected to catcher 20 and caught are charged. Thus there will be required a separate independently operating charging electrode for each jet in the printer.

As discussed previously, prior art printing devices have generally used a constant deflection potential and switched the jet drops between catch and print trajectories by selectively charging the drops. Problems have arisen as a result of "cross talk" or partial charging of the ink drops due to adjoining electrodes and due to the charge on other drops in the same drop stream. This partial charge can be as high as 25% and will generally increase as the jet density is increased. Since the deflection force of a field acting on a drop is proportional to the drop charge, the partially charged drops receive deflection forces on the order of 25% of that applied to a fully charged drop.

The circuit shown in FIG. 10 overcomes these problems by reducing the deflection field experienced by inadvertently charged drops. When a drop is to be printed, a zero is provided on line 119 with the result that the drop which is then adjacent charging electrode 14 will not be charged. This "zero data" will be entered in shift register 120 and shifted along the register at a rate corresponding to the rate of movement of drops 70 past electrodes 118. As an uncharged drop 70 passes each of electrodes 118, those electrodes will not provide a deflection field for deflecting the drop. Thus it can be seen that a drop which is inadvertently charged to some percentage of a normal catch charge, will receive a deflecting field only from deflection electrodes which are not directly adjacent the inadvertently charged drop. It is apparent, therefore, that the deflection of the inadvertently charged drops will be substantially less than if they passed through a constant deflection field.

Figure 11:
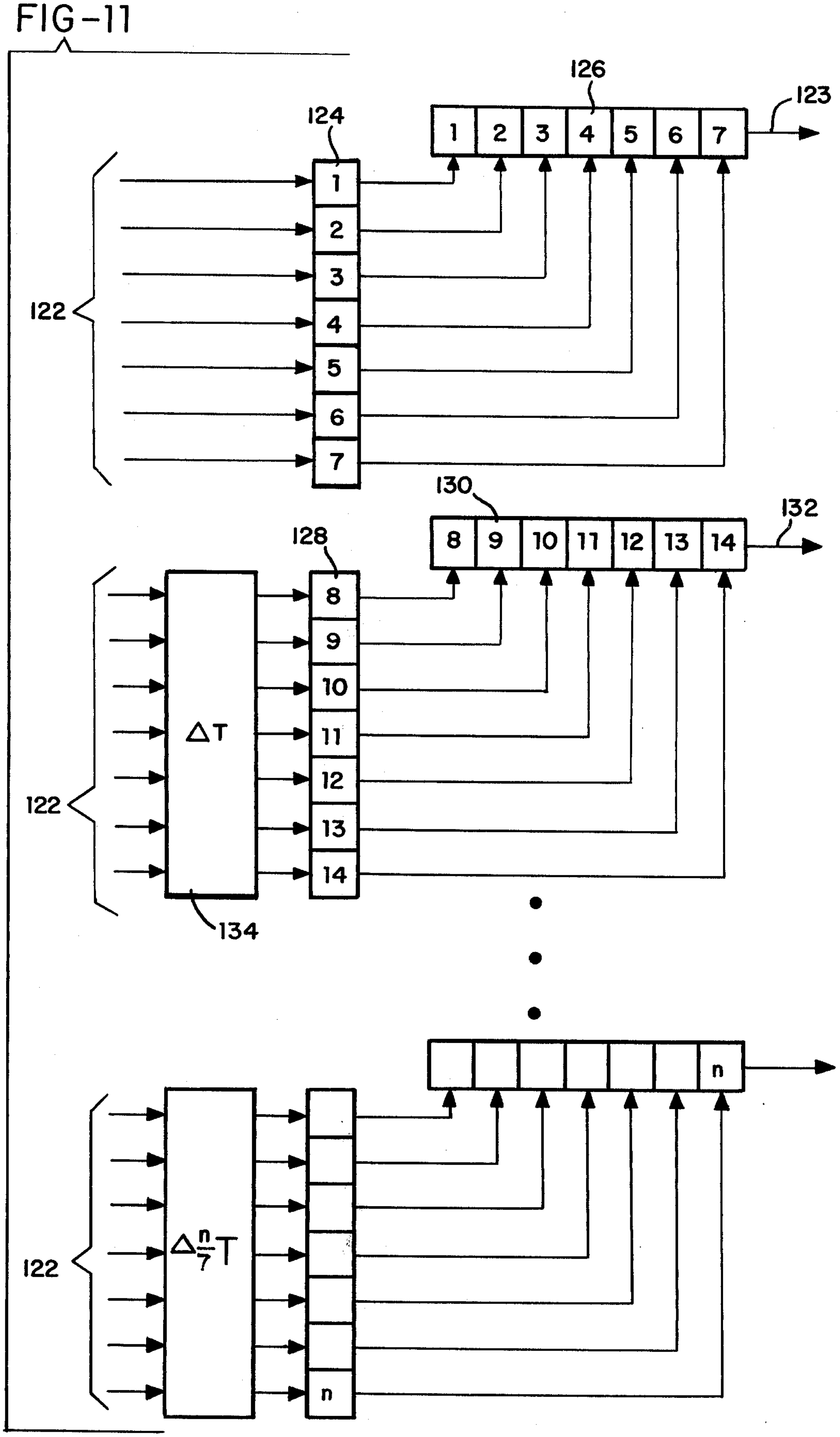
FIGS. 11 and 12 illustrate data ordering circuits useful in preparing data for application to jet control circuitry.

One arrangement for ordering print data properly for application to jet control circuitry is shown in FIG. 11. The illustrated arrangement is for a seven print position jet printer but it is understood that simple modifications would make this arrangement applicable to other configurations. A line of print information is assembled by a control computer in a manner well known in the art, such as shown in U.S. Pat. No. 3,913,719, issued Feb. 24, 1975, to Frey, and assigned to the assignee of the present invention. The line of print information is supplied to lines 122 and will specify in binary form whether a dot is to be printed at each of the print positions across the width of the print web. As seen in FIG. 5, however, this information cannot simply be supplied in parallel without appropriate delay to each of the drop jet control circuits, since the drops for positions one through *n* are each applied at a separate time.

Since the print positions $P_1$–$P_7$ (FIG. 5) are serviced in the order $P_7$, $P_6$, $P_5$, $P_4$, $P_3$, $P_2$, $P_1$ by a single jet, print data which is to be supplied to the control circuit for this jet via line 123 is serialized by register 124 and shift register 126. The rate at which shift register 126 is shifted will be dependent upon the rate at which the jet is switched between print positions. Assuming one drop is deposited at each print position, the shift register 126 will be shifted at the stimulation frequency, with appropriate phase adjustment. In similar fashion, registers 128 and 130 will serialize data for application via line 132 to the jet control circuit which services print positions $P_8$–$P_{14}$. It will be appreciated, however, that this second jet will necessarily be printing at times subsequent to those at which the first jet prints. The necessary delay $\Delta T$ is equal the time which it takes web 12 to move the distance $\Delta J$ (FIG. 5) between corresponding positions of successive jets. This delay may be provided with shift registers of the appropriate length being clocked by tachometer pulses which provide an indication of the speed of web movement. Similar circuitry is provided, as indicated, for each of the jets in the array.

Figure 12:
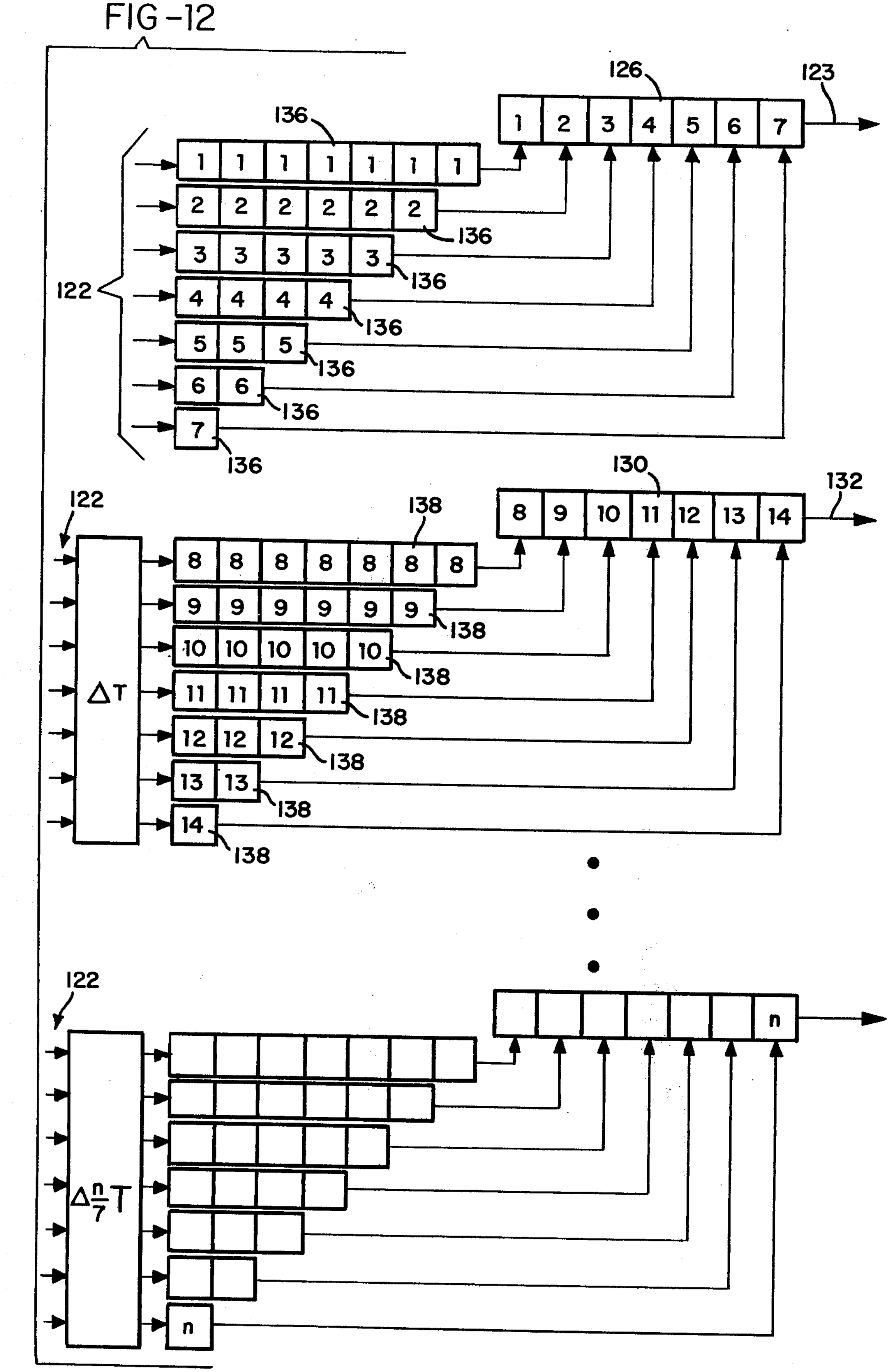

Reference is now made to FIG. 12 which illustrates an alternative data assembling arrangement. The circuit of FIG. 12 is similar to that of FIG. 11, with the exception that a series of shift registers of staggered length 136, 138, etc. are provided in place of the registers 124, 128, etc. Registers 136 provide a one increment data delay between print positions which permits the print bar to be positioned at less of an angle, as discussed previously. As is apparent from the drawings, the print data assembled in register 126 is control data for printing at print positions on seven successive lines, rather than on a single line, as in FIG. 11.

Figure 13:
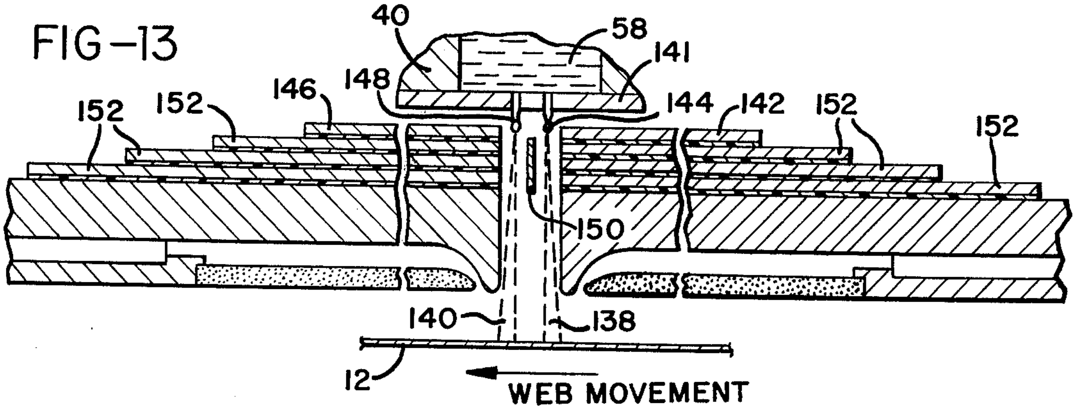
FIG. 13 is a partial sectional view illustrating a further embodiment of the present invention.

Reference is now made to FIG. 13 illustrating another embodiment of the present invention. Control of the drop jets may be made by means of any of the jet control schemes discussed above. The jet printer comprises a means for generating a first and second row of drop streams 138 and 140, respectively. Orifice plate 141 will define two rows of orifices which are positioned so that the drops generated in the two rows will interlace to provide even drop distribution across the web. Charge electrode 142 is associated with the drop stream row 138 and induces charges on filaments 144. Similarly, charge electrode 146 is associated with the row 140 of drop streams and induces charges on filaments 148. Deflection plate 150 is positioned between and parallel to the rows of drop streams. A plurality of deflection electrodes 152 are positioned along each of the drop streams and generates deflection fields in conjunction with the deflection ribbon 150.

Operation of the printer illustrated in FIG. 13 is identical to that described with respect to previous embodiments. The jets in the dual row configuration are positioned such that the two rows interlace and service alternate groups of print positions across the width of the web 12. It should be noted that an additional data delay will necessarily be required for the jets in the row 140 with respect to those in row 138 to provide for proper interlace of ink drops.

The present invention may also find application in ink jet printers which include a row of drop streams along a line substantially perpendicular to the direction of movement with respect to the web. As suggested above with respect to FIG. 10, the use of multiple parallel deflection fields for selective deflection of drops will result in substantial reduction in the effect of jet-to-jet crosstalk—a significant feature even in a binary system in which each jet services only a single print position. Additionally multiple print positions may be serviced by each jet in a printer having a jet row transverse to the direction of web movement if the parallel deflection fields are provided for deflection which is not parallel to the direction of web movement. Multiple deflection electrodes may be positioned along each jet, adjacent the drop path and between jets.

While the method and forms of apparatus herein described constitute preferred embodiments of the present invention, it is to be understood that the invention is not limited to this method and these precise forms of apparatus, and that changes may be made therein without departing from the scope of the invention.

What is claimed is:

1. An ink jet printer for printing a print image defined by print data signals supplied thereto, comprising:
   - means for generating a row of drop streams,
   - means for transporting a print receiving medium in a direction which is oblique to said row,
   - means for charging the drops in said drop streams,
   - deflection electrode means for generating a plurality of parallel electrical deflection fields extending in the same direction substantially perpendicular to said row of drop streams, said drops passing successively through said parallel deflection fields,
   - catcher means extending parallel to said row for catching drops which are in catch trajectories, and
   - control means for controlling the deflection fields generated by said deflection electrode means in response to print data signals such that selected ones of said drops will be directed into catch trajectories and other ones of said drops will be directed into print trajectories, the ones of said drops in said print trajectories striking said medium and forming a print image thereon.

2. The ink jet printer of claim 1 further comprising means for generating a second row of drop streams adjacent and parallel to said row of drop streams.

3. The ink jet printer of claim 2 in which said deflection electrode means comprises:
   - a grounded deflection ribbon positioned between and parallel to said rows of drop streams, and
   - a plurality of deflection electrodes positioned along each of the drop streams for generating a plurality of deflection fields in conjunction with said deflection ribbon.

4. The ink jet printer of claim 1 in which said means for charging the drops in said drop streams comprises means for charging all of said drops in said drop streams.

5. The ink jet printer of claim 1 in which said means for charging the drops in said drop streams comprises means for selectively charging said drops and in which said deflection electrode means comprises a plurality of deflection electrodes adjacent each of said drop streams for providing all-parallel deflection fields along the path of each of said selectively charged drops.

6. The ink jet printer of claim 1 in which said deflection electrode means comprises a plurality of deflection electrodes positioned along the path of each of said drop streams.

7. The ink jet printer of claim 6 in which said control means includes means for applying a selected deflection potential in succession to each deflection electrode adjacent said drop streams in synchronism with the movement therepast of charged drops such that charged drops in said drop streams may be deflected into selected ones of a plurality of print trajectories.

8. The ink jet printer of claim 6 in which said control means includes means for applying deflection potentials only to predetermined ones of said deflection electrodes as charged drops pass adjacent said electrodes such that said charged drops will be directed into selected ones of a plurality of print trajectories.

9. The ink jet printer of claim 6 in which said control means comprises means for applying selectively a deflection potential in succession to each of said deflection electrodes adjacent said drop streams in synchronism with the movement therepast of charged drops, the deflection potential applied to each of said electrodes being such that the drops affected thereby will be directed into a catch trajectory and the drops unaffected thereby will strike said print receiving medium.

10. The ink jet printer of claim 9 in which said means for charging includes means for charging all of the drops in said drop streams.

11. The ink jet printer of claim 9 in which said means for charging includes means for charging drops in said drop streams selectively.

12. An ink jet printer, comprising:
means for generating a row of drop streams,
means for transporting a print receiving medium past said row of drop streams such that said streams are directed at said print receiving medium,
means for charging drops in said drop streams,
a plurality of deflection electrodes positioned adjacent the path of each of said drop streams for generating parallel deflection fields,
catcher means adjacent said row for catching drops which are in catch trajectories, and
control means for applying deflection potentials to each deflection electrode only as a charged drop moves therepast and controlling the deflection fields generated by said deflection electrodes such that the drops in each of said drop streams will pass in succession through said parallel deflection fields generated by said deflection electrodes whereby selected ones of the drops will be directed into catch trajectories and other ones of the drops will be directed into print trajectories, the ones of said drops in said print trajectories striking said medium and forming a print image thereon.

13. The ink jet printer of claim 12 in which said means for charging drops in said drop streams charges only drops which are to be directed into catch trajectories, whereby inadvertent charging of drops which are to be directed in print trajectories affects said print trajectories only minimally.

14. The ink jet printer of claim 12 in which said row of drop streams is oblique to the direction of movement of said print receiving medium therepast.

15. In an ink jet printer in which drops of ink are deposited on a moving print receiving medium from a plurality of drop streams, and in which a plurality of deflection electrodes are positioned along the path of each of said drop streams, the method of printer operation comprising the steps of:
(a) charging all drops in the drop streams,
(b) generating a plurality of parallel electrical deflection fields substantially perpendicular to each drop stream by applying deflection potentials to the electrodes such that the drops in said drop streams will traverse one or more of said fields and will be deflected into catch or print trajectories, the ones of said drops in said print trajectories striking said medium and forming a print image thereon.

16. The method of claim 15 in which said step of generating a plurality of electrical deflection fields includes the step of:
applying a selected deflection potential to each deflection electrode adjacent the drop streams in synchronism with the movement therepast of charged drops such that charged drops will be deflected into selected ones of a plurality of print trajectories.

17. The method of claim 15 in which said step of generating a plurality of electrical deflection fields includes the step of applying deflection potentials only to predetermined ones of the deflection electrodes as charged drops pass adjacent the electrodes such that the charged drops will be directed into selected ones of a plurality of print trajectories.

18. An ink jet printer for depositing a plurality of ink drops upon a print receiving medium in a print image pattern, as specified by print image data signals supplied to said printer, comprising:
means for generating a row of ink drop streams, each of said streams directed at said print receiving medium,
means for transporting said print receiving medium past said row of drop streams,
means for charging drops in said drop streams,
a plurality of deflection electrodes positioned adjacent the path of each of said drop streams for generating parallel deflection fields extending in the same direction,
catcher means adjacent said row for catching drops which are in catch trajectories, and
control means for applying deflection potentials to each of said plurality of deflection electrodes in accordance with said print image data signals, such that the parallel deflection fields generated by said deflection electrodes will deflect drops in said drop streams to appropriate print positions on said print receiving medium to form the print image pattern specified by said print image data signals.

19. The ink jet printer of claim 18 in which said means for charging drops includes means, responsive to said control means, for selectively charging drops in said drop streams in accordance with said print image data signals.

20. The ink jet printer of claim 18 in which said means for charging drops comprises means for charging all drops in said drop streams.

21. An ink jet printer, comprising:
means for generating a row of drop streams,
means for transporting a print receiving medium past said row of drop streams such that said streams are directed at said print receiving medium,
means for charging all of the drops in said drop streams,
a plurality of deflection electrodes positioned adjacent the path of each of said drop streams for generating a plurality of parallel deflection fields,
catcher means adjacent said row for catching drops which are in catch trajectories, and
control means for applying deflection potentials to said plurality of deflection electrodes to control the deflection fields generated by said deflection electrodes such that the drops in each of said drop streams will pass in succession through said parallel deflection fields generated by said deflection electrodes whereby selected ones of the drops will be directed into catch trajectories and other ones of the drops will be directed into print trajectories, the ones of said drops in said print trajectories striking said medium and forming a print image thereon.

22. The ink jet printer of claim 21 in which said control means comprises means for selectively applying a deflection potential to said deflection electrodes as said drops in said drop streams move therepast such that said drops will be directed into a plurality of print trajectories.

23. The ink jet printer of claim 21 in which said control means comprises means for applying one of a plurality of deflection potentials successively to each of said deflection electrodes in synchronism with the movement of a charged drop therepast, whereby drops will be directed into one of a plurality of print trajectories in dependance upon the deflection potential applied to said deflection electrodes.

* * * * *

UNITED STATES PATENT AND TRADEMARK OFFICE

CERTIFICATE OF CORRECTION

PATENT NO. : 4,122,458

DATED : October 24, 1978

INVENTOR(S) : Suresh C. Paranjpe

It is certified that error appears in the above-identified patent and that said Letters Patent are hereby corrected as shown below:

Column 2, line 16, "water-jet" should be --inter-jet--
Column 3, line 67, "in trajectories: should be --in catch trajectories--
Column 4, line 64, "flow" should be --form--
Column 8, line 35, "$V_{mwax}$" should be -- $V_{wmax}$
Column 14, line 37, "all-parallel" should be --parallel--

Signed and Sealed this

*Twentieth* Day of *February 1979*

[SEAL]

*Attest:*

RUTH C. MASON
*Attesting Officer*

DONALD W. BANNER
*Commissioner of Patents and Trademarks*